(12) United States Patent
Yigit et al.

(10) Patent No.: US 11,601,413 B2
(45) Date of Patent: Mar. 7, 2023

(54) SINGLE SIGN-ON CONTROL FUNCTION (SOF) FOR MOBILE NETWORKS

(71) Applicant: NETSIA, INC., Santa Clara, CA (US)

(72) Inventors: Beytullah Yigit, Istanbul (TR); Can Altay, Istanbul (TR); Burak Gorkemli, Istanbul (TR); Seyhan Civanlar, Istanbul (TR)

(73) Assignee: NETSIA, INC., Santa Clara, CA (US)

( * ) Notice: Subject to any disclaimer, the term of this patent is extended or adjusted under 35 U.S.C. 154(b) by 219 days.

(21) Appl. No.: 17/070,896

(22) Filed: Oct. 14, 2020

(65) Prior Publication Data

US 2021/0112049 A1 Apr. 15, 2021

Related U.S. Application Data

(60) Provisional application No. 62/914,974, filed on Oct. 14, 2019.

(51) Int. Cl.
*H04L 9/40* (2022.01)
*H04W 12/062* (2021.01)
*G06F 21/41* (2013.01)

(52) U.S. Cl.
CPC .......... *H04L 63/0815* (2013.01); *G06F 21/41* (2013.01); *H04W 12/062* (2021.01)

(58) Field of Classification Search
CPC . H04L 63/0815; H04L 63/0807; G06F 21/41; H04W 12/062; H04W 12/06; H04W 12/48
See application file for complete search history.

(56) References Cited

U.S. PATENT DOCUMENTS

| | | | | |
|---|---|---|---|---|
| 2011/0277026 | A1* | 11/2011 | Agarwal | H04L 63/0815 726/8 |
| 2018/0131685 | A1* | 5/2018 | Sridhar | H04L 9/3265 |
| 2018/0295134 | A1* | 10/2018 | Gupta | H04L 67/02 |

* cited by examiner

*Primary Examiner* — Huan V Doan
(74) *Attorney, Agent, or Firm* — IP Authority, LLC; Ramraj Soundararajan (57) ABSTRACT

A new control function is defined for the control plane of a 5G mobile network to enable the operator's mobile user, who is using a premium network slice, to access application services on the public Internet, by operator sign-on only when accessing the application on said slice. This unique single sign-on capability allows the user to bypass the service authentication after operator authenticates the mobile device by the user session establishment procedure. The new function registers a plurality of service applications, which sign-up for single sign-on capability. It also coordinates the mapping and storage of credentials of the user across the mobile operator's service and the service provider's application for each of said plurality of service applications, and transfers user credentials to the application so that the user's sign-in step is bypassed.

20 Claims, 6 Drawing Sheets

SINGLE SIGN-ON CONTROL FUNCTION (SOF) FOR MOBILE NETWORKS

RELATED APPLICATION

This application claims the benefit of provisional application 62/914,974 filed Oct. 14, 2019.

BACKGROUND OF THE INVENTION

Field of Invention

The present invention relates to a system and method for providing service differentiation within a mobile network by introducing a new control network function designated for service authentication by-pass.

Discussion of Related Art

Any discussion of the prior art throughout the specification should in no way be considered as an admission that such prior art is widely known or forms part of common general knowledge in the field.

One of the primary technical challenges facing mobile operators today is the ability to deliver a wide array of network performance characteristics which future applications and services will demand. To name a few, bandwidth, latency, packet loss, security, and reliability will greatly vary from one service to the other. Emerging applications such as remote operation of robots, massive Internet of Things (IOT), and self-driving cars require connectivity, but with vastly different characteristics. The combination of architecture flexibility, software programmability, and the needs of different business segments (medical, factories, military, public safety, etc.) and applications have led to the creation of the concept of network slicing in 5G mobile networks. A network slice provides a convenient way to completely segment the network to support particular types of services or businesses. Furthermore, each slice can be optimized according to capacity, coverage, connectivity, security and performance characteristics. Since the slices can be isolated from each other, as if they are physically separated both in the control and user planes, the user experience of the network slice will be the same as if being on a separate network.

A network slice can span all domains of the network including the software applications running on network nodes, specific configurations of the core transport network, access network configurations, as well as the end devices. 3GPP standards architected a sliceable 5G infrastructure to provide many logical network segments over a common single physical network (see 3GPP's TR 28.801 document titled, "Telecommunication management; Study on management and orchestration of network slicing for next generation network"). The technologies such as software defined networking (SDN), wherein control plane (CP) and user plane (UP) are separated, and network function virtualization (NFV) are the key enablers for breaking up traditional network structures. With network slicing, customizable and virtualized network components can be stitched together, using only software, to provide the right level of connectivity.

The 5G standardization efforts have gone into defining specific slices and their requirements based on application/service type. For example, the user equipment (UE) can now directly specify its desired slice using a new field in the packet header called Network Slice Selection Assistance ID (NSSAI). A subfield of NSSAI is Slice/Service Types (SST) that is used to indicate the slice type. The standards already define most commonly usable network slices and reserved the corresponding standardized SST values (see ETSI TS 23.501). For example, SST values of 1, 2 and 3 correspond to slice types of enhanced Mobile Broadband (eMBB), ultra-reliable and low-latency communications (uRLLC) and massive IoT, respectively. The Access and Mobility Management Function (AMF) of the core network retrieves the slices that are allowed by the user's subscription and interacts with the Network Slice Selection Function (NSSF) of the core network to select the appropriate network slice instance for that traffic on the RAN. 3GPP specified NSSF for 5G as a new virtual network management function that belongs to Operating Support System/Business Support System (OSS/BSS) layer whose sole role is to deliver an appropriate slice to the user/application while authenticating it.

According to the session establishment or modification procedures in the 5G Service-Based Architecture (SBA), the user first connects to Access and Mobility Function (AMF) as explained above, which determines which Session Management Function (SMF) instance that is best suited to handle the connection request for that slice by querying the Network Repository Function (NRF). There may be: (a) a single SMF in the network to handle all network slices, (b) a plurality of SMFs, one SMF serving each slice, or (c) a plurality of SMFs serving each slice. The SMF instance serving a user can be selected according to the location of user's mobile device or other criteria. After the selection, the AMF hands-over the session establishment task to the chosen SMF.

If the UE has subscribed to multiple slices (because different applications use different types of slices), then AMF can steer the connection request towards each slice's SMF. The chosen SMF interacts with the Policy Control Function (PCF) to obtain user's mobile network profile information stored within the Unified Data Management (UDM), which has the role of the Home Subscriber Server (HSS) of 4G, which also stores user authentication information in a database. The PCF provides the policies such as quality of service (QoS) and charging rules.

The SMF is primarily responsible for (a) selecting one of the User Plane Functions (UPFs) to forward the data packets of the user in the user plane (UP), and setting UPF configuration parameters to ensure proper routing of packets, while guaranteeing the delivery of user's data packets according to the slice requirements; (b) creating, updating and removing Protocol Data Unit (PDU) sessions and managing session context; (c) performing the role of Dynamic Host Configuration Protocol (DHCP) server and assigning a private IP address to the user from the DHCP address pool.

The SMF is responsible for checking whether the UE requests are compliant with the user subscription and for connectivity charging, which is achieved by interacting with a Charging Function (CHF). Note that if the user subscribed to multiple slices, it may acquire multiple IP addresses. All these control functions and steps of user registration to multiple slices are clearly defined in the specification of 5G standards, and therefore are prior art. Furthermore, applications on the mobile device of the user are admitted to different slices through simple configurations, for example, by using different IP addresses and/or port numbers.

The concept of slice must allow service applications to distinguish premium users from regular users, wherein premium users use a so-called premium network slice (e.g., a faster, or larger bandwidth slice) while the regular users use a default slice, where there is only best-effort QoS to access a particular service application. Please note that for simplicity any slice that is not a default slice is named a 'premium slice' here without making a distinction on specific properties of different type of slices. An important advancement would be if service application recognized the premium slice user and offers the user special services, one of which could be bypassing the service application's authentication to allow the user to more rapidly and conveniently access the application. Another possible offering would be distinguishing application features seen by default and premium slice users.

When users have to access a large number of applications they have to remember and securely store a large number of authentication credentials, which is highly inconvenient. Furthermore, the requirements for password secrecy expose application services and the transport network to attacks where user's passwords can be guessed or deceitfully acquired. When the user is on the move (say in a car), retrieval of his/her user-ID and secretly stored password creates an additional burden.

According to an aspect of invention, a new control function called Single Sign-On Function (SOF) is designed to allow bypassing of sign-in procedures of service applications once the operator authenticates the mobile user's device, whether these are mobile web applications or any other types of applications. More generally, SOF provides secure mapping of user credentials to the service application domain from the mobile network domain.

In one embodiment of this invention, the service application registers with SOF and issues a digitally signed single sign-on (SSO) ticket per its user to SOF, wherein the SSO ticket includes at least the telephone number of the user or another identification such as the social security number. It may have other attributes such as length of time applicable to SSO. By using a user-specific SSO ticket, the application avoids sharing the user-ID. The SSO ticket is authenticated because it is digitally signed by the application service. The service application can send the SSO tickets one by one or in batches. In order to issue an SSO ticket for the user, the service provider gets the consent of the user. Furthermore, the service provider requests user's mobile telephone number to be able to associate with the SSO ticket. When the SSO ticket arrives along with the telephone number, the operator can now associate the ticket with the user's mobile device.

When the service application's user connects to the mobile network and attempts to access the application that issued the SSO ticket, SOF intercepts the access request and presents that digitally signed SSO ticket to the application on behalf of the user, and enables application server to immediately create and send a digitally signed 'cookie' (or some type of application pass) to the user's application client. From there on, the user does not need to authenticate with the service application until the cookie has expired.

More generally, this new control function that is serving premium slice users enables application service differentiation across users of different slice types. For example, the second stage of authentication by any service application is simply eliminated so that the premium slice user can directly access a service application. Once authenticated, the users can also be offered different menu of capabilities via a premium service defined only for users of the premium slice.

In another embodiment, the service application may opt to use the SOF service for all its mobile users without distinguishing premium users from the default users. Many such embodiments are feasible depending on the business model of the service provider.

The service application provider and operator collaborate through sharing user identifiers in the operator and service application domains. The operator deploys SOF, the control function according to this invention, attached to the SMF(s) within the control plane of the slice and attached to the service applications. The SOF maps user credentials and enables user authentication bypass.

Embodiments of the present invention are an improvement over prior art systems and methods.

SUMMARY OF THE INVENTION

In one embodiment, the present invention provides a Single Sign-On Function (SOF) comprising: (a) a first communication interface to communicate with a session management function (SMF) component, the first communication interface communicating user's mobile network-specific authentication information; (b) a second communication interface to communicate with a Unified Data Management (UDM) component, the second communication interface communicating registry information and service application-specific user authentication information to the UDM; (c) a third communication interface to communicate with a User Plane Function (UPF) controller, the third communication interface communicating specific routing policies based on an IP address of one or more data packets originating from a User Equipment (UE) to enable a single sign on (SSO) service with the UPF controller; (d) a fourth communication interface to communicate with at least one application authentication server, the fourth communication interface: (1) communicating with the at least one application server to register at least one application service and, after registering, (2) communicating with the at least one application server to receive a digitally signed SSO ticket assigned to the UE that is connected to a mobile network, wherein the SOF is implemented in a control plane and a Network Slice Selection Function (NSSF) associates at least one premium network slice with the UE, the SMF assigning a unique private IP address, user_IP_address, to the UE; and wherein the SOF sends a special packet forwarding instruction to the UPF Controller to route the one or more packets received by UPF that is sourced by the user_IP_address of the UE's to a service_IP_address of the at least one application authentication server.

In another embodiment, the present invention provides a method as implemented in a Single Sign-On Function (SOF), the SOF comprising (i) a first communication interface to communicate with a session management function (SMF) component, the first communication interface communicating user's mobile network-specific authentication information; (ii) a second communication interface to communicate with a Unified Data Management (UDM) component, the second communication interface communicating registry information and service application-specific user authentication information to the UDM; (iii) a third communication interface to communicate with a User Plane Function (UPF) controller, the third communication interface communicating specific routing policies based on an IP address of one or more data packets originating from a User Equipment (UE) to enable a single sign on (SSO) service with the UPF controller; (iv) a fourth communication interface to communicate with at least one application authentication server, the fourth communication interface: communicating with the at least one application server to register at least one application service and, after registering, communicating with the at least one application server to receive a digitally signed SSO ticket assigned to the UE that is connected to a mobile network, the SOF is implemented in a control plane and the a Network Slice Selection Function (NSSF) associates at least one premium network slice with the UE, the method comprising: (a) securely registering the at least one application authentication server, wherein the registering comprises receiving the following information from the at least one application authentication server: (1) a unique service-ID or name, and (2) an IP address(es) or hostname; (b) sending received information in (a) to the UDM; (c) receiving the digitally signed SSO ticket and a telephone number of the UE; (d) sending the digitally signed SSO ticket and a telephone number of the UE to the UDM for storage; (e) assigning a unique private IP address, user_IP_address, to the UE when the UE connects to the mobile network; and (f) sending a special packet forwarding instruction to the UPF Controller to route the one or more packets received by UPF that is sourced by the user_IP_address of the UE's to a service_IP_address of the at least one application authentication server.

In yet another embodiment, the present invention provides an article of manufacture comprising non-transitory computer storage medium storing computer readable program code which, when executed by a computer, implements a method as implemented in a Single Sign-On Function (SOF), the SOF comprising (i) a first communication interface to communicate with a session management function (SMF) component, the first communication interface communicating user's mobile network-specific authentication information; (ii) a second communication interface to communicate with a Unified Data Management (UDM) component, the second communication interface communicating registry information and service application-specific user authentication information to the UDM; (iii) a third communication interface to communicate with a User Plane Function (UPF) controller, the third communication interface communicating specific routing policies based on an IP address of one or more data packets originating from a User Equipment (UE) to enable a single sign on (SSO) service with the UPF controller; (iv) a fourth communication interface to communicate with at least one application authentication server, the fourth communication interface: communicating with the at least one application server to register at least one application service and, after registering, communicating with the at least one application server to receive a digitally signed SSO ticket assigned to the UE that is connected to a mobile network, the SOF is implemented in a control plane and the a Network Slice Selection Function (NSSF) associates at least one premium network slice with the UE, the article of manufacture comprising: (a) computer readable program code securely registering the at least one application authentication server, wherein the registering comprises receiving the following information from the at least one application authentication server: (1) a unique service-ID or name, and (2) an IP address(es) or hostname; (b) computer readable program code sending received information in (a) to the UDM; (c) computer readable program code receiving the digitally signed SSO ticket and a telephone number of the UE; (d) computer readable program code sending the digitally signed SSO ticket and a telephone number of the UE to the UDM for storage; (e) computer readable program code assigning a unique private IP address, user_IP_address, to the UE when the UE connects to the mobile network; and (f) computer readable program code sending a special packet forwarding instruction to the UPF Controller to route the one or more packets received by UPF that is sourced by the user_IP_address of the UE's to a service_IP_address of the at least one application authentication server.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a base station, UPF, SMF, controller, etc.) stores and transmits (internally and/or with other electronic devices over a network) code (composed of software instructions) and data using machine-readable media such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device such as a base station, switch, controller, or a control function is a piece of networking component, including hardware and software that communicatively interconnects with other equipment of the network (e.g., other network devices, and end systems). Switches are represented as User Plane Function (UPF) in 5G networks which provide network connectivity to other networking equipment such as switches, gateways, and routers that exhibit multiple layer networking functions (e.g., routing, layer-3 switching, bridging, VLAN (virtual LAN) switching, layer-2 switching, Quality of Service (QoS), and/or subscriber management), and/or provide support for traffic coming from multiple application services (e.g., data, voice, and video).

The UPF also provides firewall and Network Address Translation (NAT) functions. The routing and configuration intelligence of UPF usually is in a UPF controller (an SDN controller) within the control plane. The UPF controller may be implemented as an integral component of the SMF.

The User Equipment (UE) is a user device such as a cellular phone, pad, a mobile sensor, a computer or another type of equipment that wirelessly connects to the network. Any physical device in the network has a type, location, ID/name, Medium Access Control (MAC) address, and Internet Protocol (IP) address. Furthermore, a physical device can host a collection of Virtualized Network Functions (VNFs), each identified by a virtual port number and/or virtual IP address. The AMF, SOF, SMF, SDN controller, OSS/BSS or any VNF can be on a single computer or distributed across multiple computers identified by at least an IP address, MAC address, and one or more Port numbers.

The IP address of a User Equipment (UE) is assigned from a private address space by the SMF for packet forwarding within the mobile core network, providing a local routability. However, the UE's IP address must be translated into a public IP address before entering the public Internet so that the UE's traffic is globally routable. Network Address Translation (NAT) only deals with 1:1 translation (i.e., each private address is translated into a public address). The n:1 translation (i.e., each group of 'n' number of different private addresses is translated into a single public address), however, it demands an adaptation of the port number locally chosen by the UE to a different port number to uniquely identify each UE. This method is known as Port and Address Translation (PAT) or Network Address Port Translation (NAPT). So, PAT replaces the UE's private IP address with a public IP address (and vice versa). In addition, the UE's utilized port number is replaced by one of PAT free port numbers from a large pool. When we use the term 'IP address and port number' for a UE, we mean the SMF assigned private address when UEs data packets travel within the operator's core network, and the UPF/PAT-translated public IP address and port address pair when UEs data packets travel the public Internet. The SMF either directly instructs the UPF/PAT for the IP address and port number mapping, or indirectly instructs UPF/PAT via the UPF controller.

Note that while the illustrated examples in the specification discuss mainly 5G networks relying on SBA using SDN (as Internet Engineering Task Force [IETF] and Open Networking Forum [ONF] defined), and NFV (as European Telecommunications Standards Institute (ETSI) defined), embodiments of the invention may also be applicable in other kinds of network (mobile and non-mobile) that are sliceable.

Figure 1:
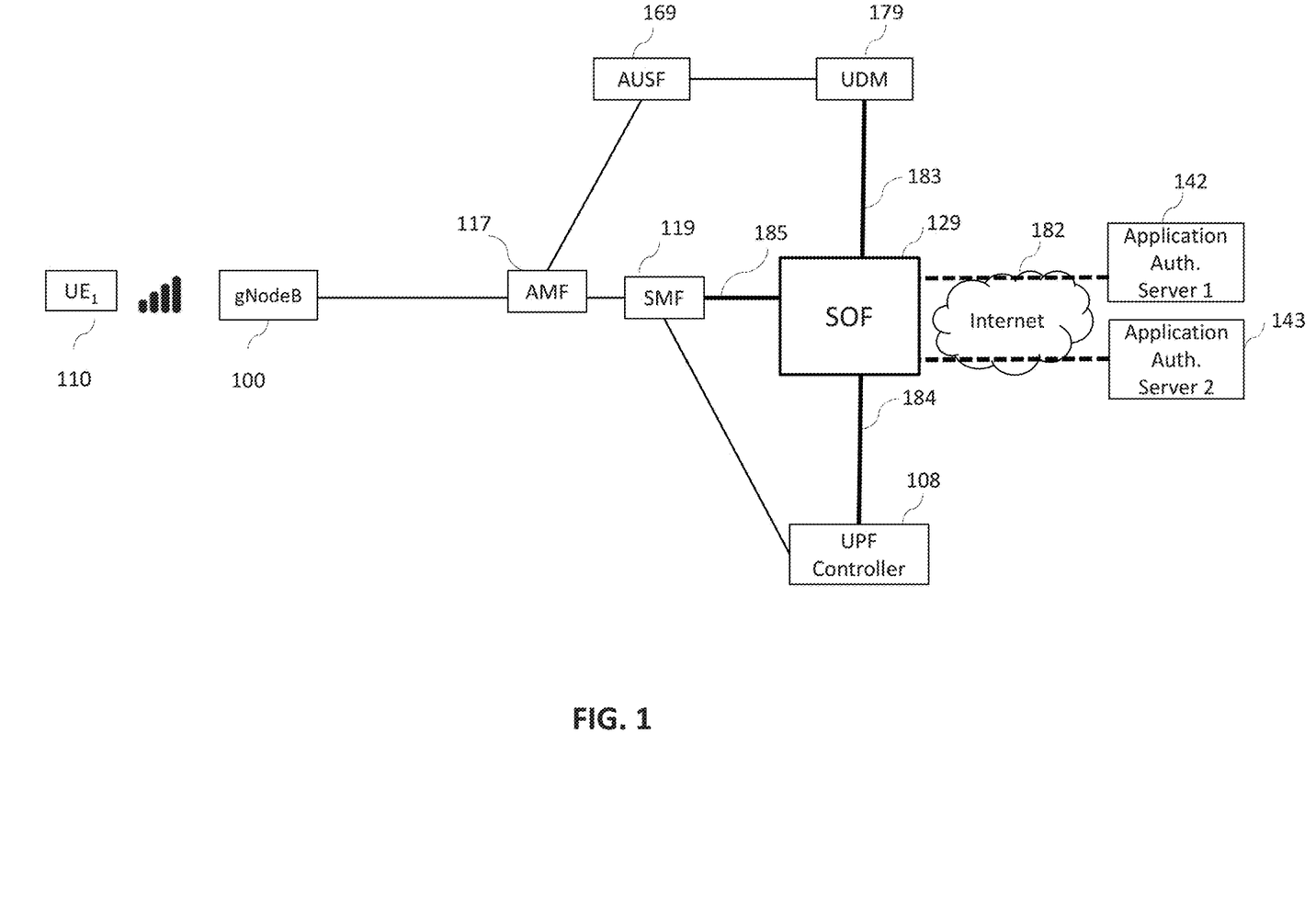
FIG. 1 illustrates an exemplary 5G's control network with SOF according to invention.

FIG. 1 illustrates an exemplary network illustrating the SOF function within the control plane of an exemplary 5G network. UE 110 is a mobile device that is attached to gNodeB (base station) 100 with the 5G radio interface. Note that only those key control plane components that play role during session establishment are illustrated in the diagram. UE 110 first connects to AMF 117, which determines which Session Management Function (SMF) instance that is best suited to handle the connection request into requested slice. After authenticating the user with AUSF 169, and determining the slice type, AMF 117 hands-over the session establishment task to the chosen SMF 119, which in turn selects a UPF to serve the traffic of the user in the user plane (UP), and sets up its configuration parameters for proper traffic steering to ensure the appropriate routing of packets. This means that UPF control function logically sits within the SMF. The Dynamic Host Configuration Protocol (DHCP) server within the SMF assigns a free private IP address to the UE from the DHCP address pool and configures the UPF (PAT subcomponent) for the public IP address and port number mapping for traffic destined to the public Internet. UPF controller 108 is shown explicitly in FIG. 1, which communicates with SMF to determine the packet forwarding rules according to policies that apply to a specific slice and a specific user's traffic.

The routing of traffic within the data plane of the core network (i.e., between the UEs and a plurality of UPFs) is performed using the UE's private address and the UE selected port number. In stark contrast, the communications of the UE with the public Internet is performed using the public IP address and port number pair assigned by the PAT.

According to an embodiment of this invention, a plurality of Single Sign-On Function (SOF) 129 can be implemented in the control plane. A single instance is illustrated in FIG. 1. SOF 129 has several interfaces. Interface 185 is between SMF 119 and SOF 129 to communicate user's mobile network-specific authentication information. Interface 183 is between UDM 179 and SOF 129 to communicate registry information and service application-specific user authentication information to the UDM by SOF 129. Here, we assumed that SOF does not have a resident database but uses the UDM function to store various user credentials. As an alternative, the registry information can be stored within the SOF or in a separate registry repository. SOF 129 communicates specific routing policies based on the IP address of user data packets to enable the SSO service with UPF controller 108.

Interface 182 is between each service application's authentication server and SOF 129. When a plurality of different applications sign up for the service, there will be a plurality of interfaces 182, one interface with each different application server. Service application uses interface 182 not only to register the application service to SOF 129, but also each user subscribing to SSO, by sending a digitally signed SSO ticket assigned to the user and user's telephone number. Note that there is no user-ID and password that is shared.

Interface 182 traverses the public Internet as well as the UP of the mobile core network between application server and SOF 129 through a highly secure (encrypted) connection such as a VPN or an IPSec tunnel.

In one embodiment, the service application's user authentication function can be separated for the SSO service from the service application's general user population. This separation has benefits such as more efficient and faster authentication operations, as well as the ability to offer other premium services that are cascaded with SSO. However, in another embodiment, the authentication function may not be separated from the general user population's authentication.

Many different embodiments of SOF are possible. For example, SOF can be implemented as a Virtual Network Function (VNF) or Physical Network Function (PNF). It may co-reside with each SMF or may reside elsewhere. There may be a single or a plurality of SOF serving a slice. There may be a single SOF serving a plurality of different application services, or there may be a dedicated SOF per application service. There may be a single SOF in the control network serving a plurality of slices, or a SOF (or a plurality of) per slice. The chosen architecture depends on the business model and the scale of each SOF implementation.

Figure 2:
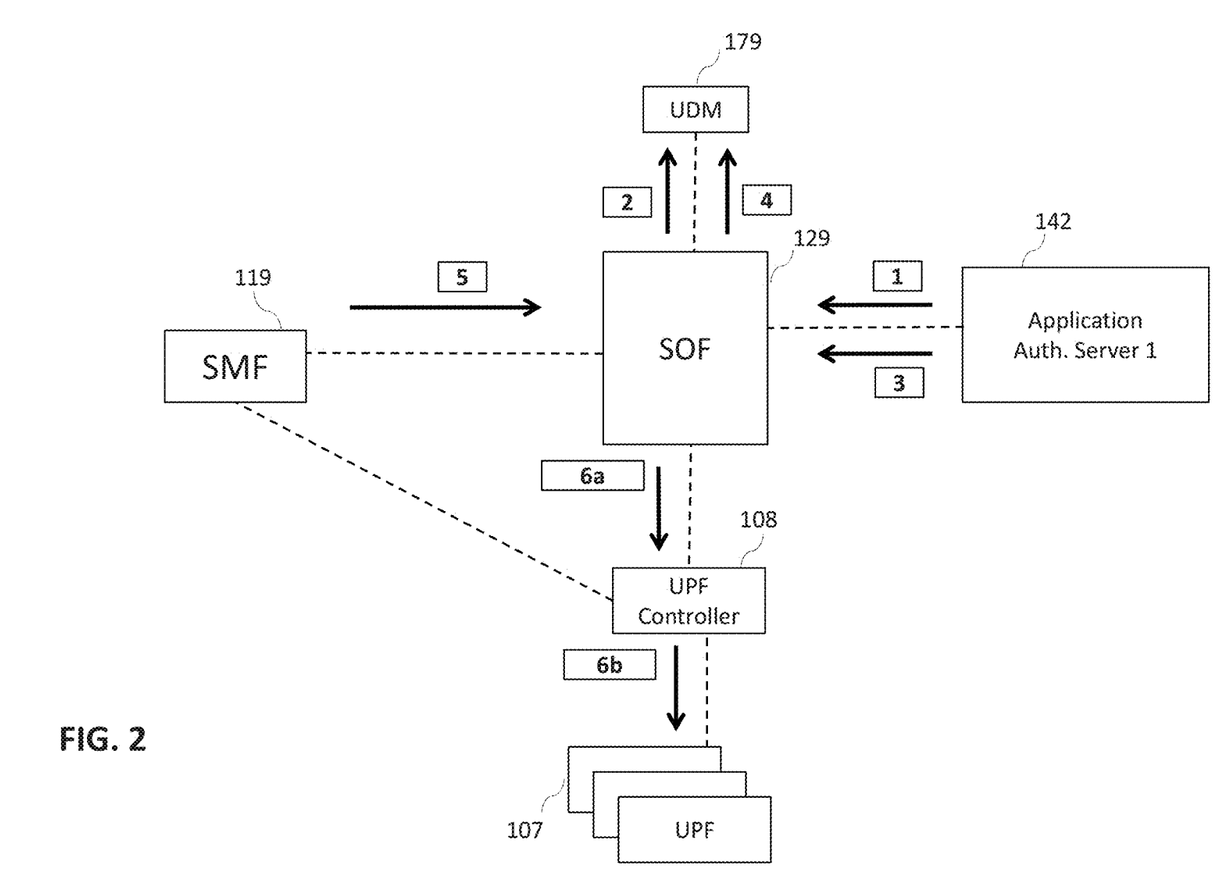
FIG. 2 illustrates control plane (CP) operations according to invention.
Figure 3:
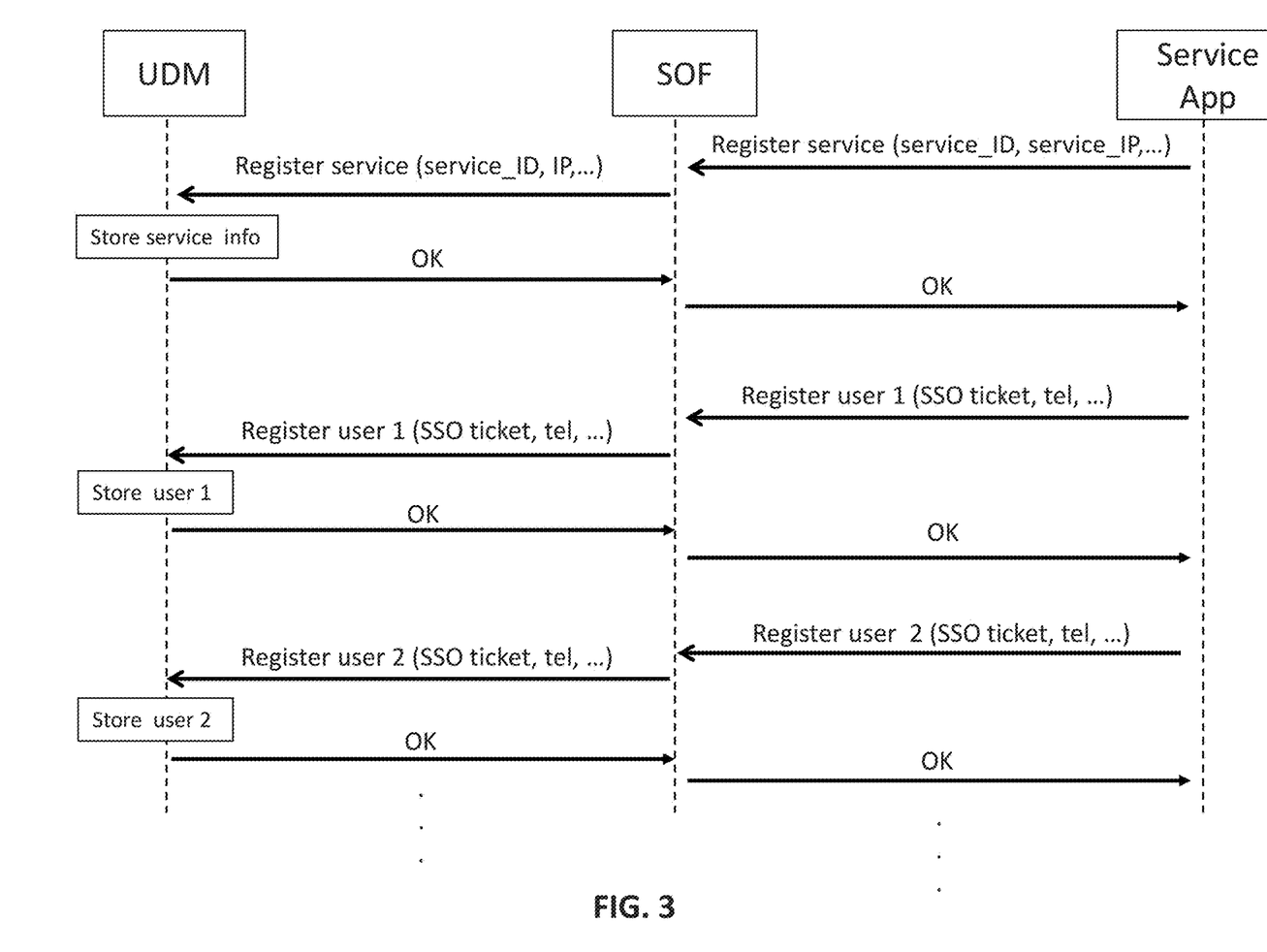
FIG. 3 illustrates an exemplary control plane (CP) message sequence according to invention.

The simplified control plane interactions of SOF 129 are illustrated in FIGS. 2 and 3. There are five key steps:

Step 1—A service application 142 that agrees to use SOF must first securely register. The registered service is recognized by a unique service-ID or name (e.g., myvideostream) and an IP address(es) or hostname of the application's authentication server 142. Then, SOF configures a secure channel towards the service application's authentication server.

Step-2—Once the service application's registration is completed, SOF 129 sends specific service-ID/name and its server's IP address to UDM 179.

Step-3—The service application's user-registration process asks the user if he/she wants SSO. If yes, the process asks for the 'mobile operator's name' and 'user's mobile telephone number'. Thereafter, the service application generates a digitally signed SSO ticket for said user. The service application sends the digitally signed SSO ticket and the telephone number for each user to SOF 129. Note that this process is performed only once at the user's service sign up/registry stage. If/when the user de-registers, the service application revokes the SSO ticket.

Step-4—SOF 129 sends the information obtained in above step to UDM 179, which in turn, stores it associated with mobile device authentication information. This step completes the service and user registration with SOF.

Step-5—When UE 110 connects to the mobile network, SMF 119 of the premium slice assigns UE 110 a unique private IP address from its DHCP address pool. SMF 119 also determines the {Public IP: port number} translated by the PAT for use in the public domain, and sends the assigned pair along with user's telephone number to SOF 129. In turn, SOF 129 checks to determine if there is an SSO ticket corresponding to the user's telephone number by querying UDM 179. If yes, it asks UDM 179 to store the unique IP address of the UE along with user identity information.

An exemplary entry in the database of UDM 179 looks like:

---
service-ID=myvideo; service_IP_address:88.98,74.5;
 tel_no=555 480 2528; user_IP_address:192.134.56.78;
 user_SSO ticket= 0AB8iPp0987plky12rT
--- service-ID=myvideo; service_IP_address: 88.98,74.5;
 tel_no=554 440 5578; user_IP_address:192.134.56.9;
 user_SSO ticket= 0aK8iPp0977plky11rX
---

There may be a plurality of SSO-enabled service applications of a user. In that case, there will be a list of service-IDs and SSO tickets associated with the user.

Step-6a and 6b—In step 6a, SOF 129 sends a special packet forwarding instruction to UPF Controller 108 to route any packets received by UPF that is sourced by UE 110's user_IP_address and destined to service application authentication server 142's service_IP_address towards SOF 129. In step 6b, the UPF controller 108 configures UPF 107. It is important to note that once user is authenticated (the first set of packets of the flow), the packet forwarding instructions will be modified to route data packets of the user without needing to go through SOF 129. Thus, SOF 129 does not act as a proxy to the user.

When UE 110 tries to access the registered service application, say 'myvideo', the UPF will steer that request directly towards the SOF.

Figure 4:
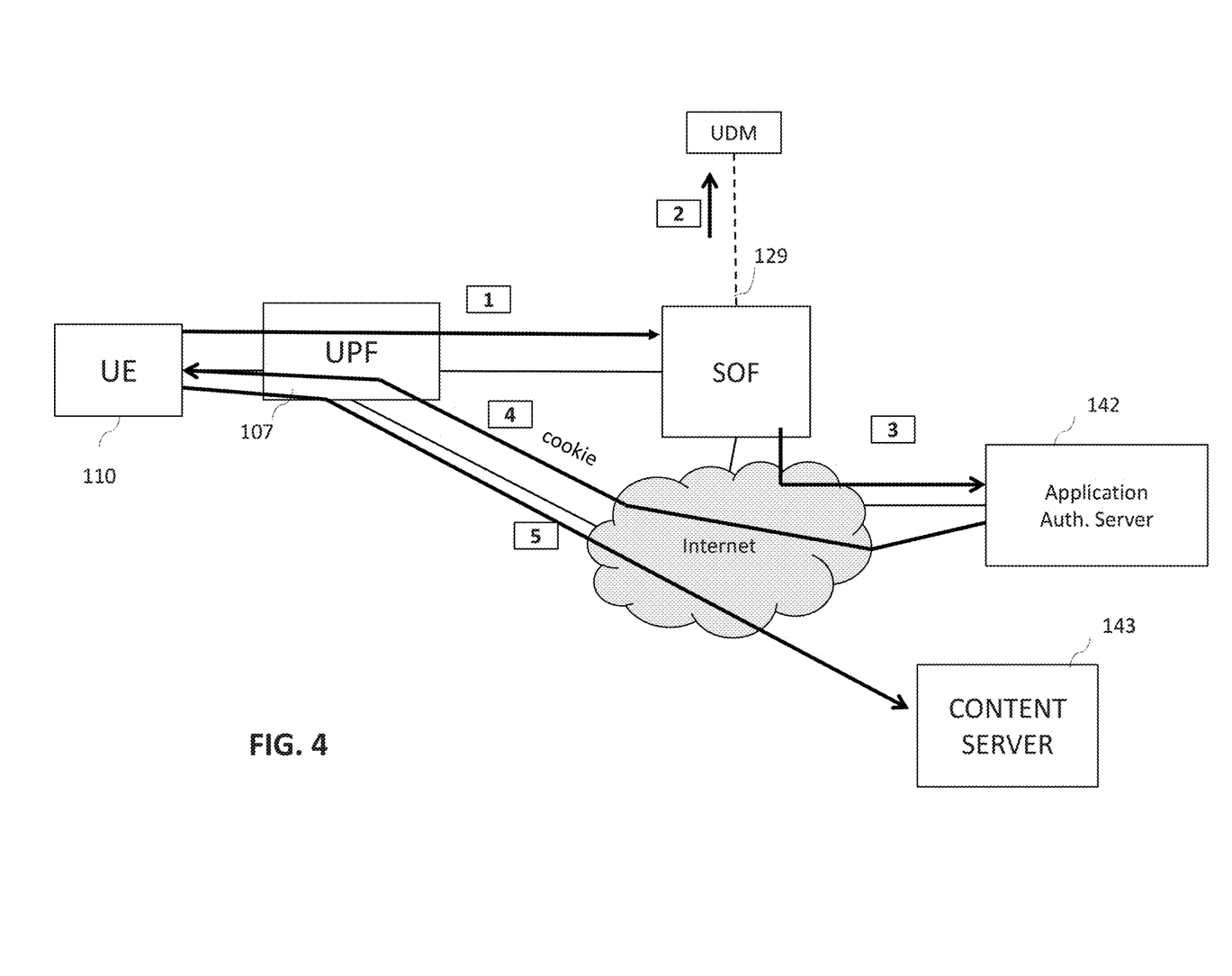
FIG. 4 illustrates user plane (UP) operations according to invention.
Figure 5:
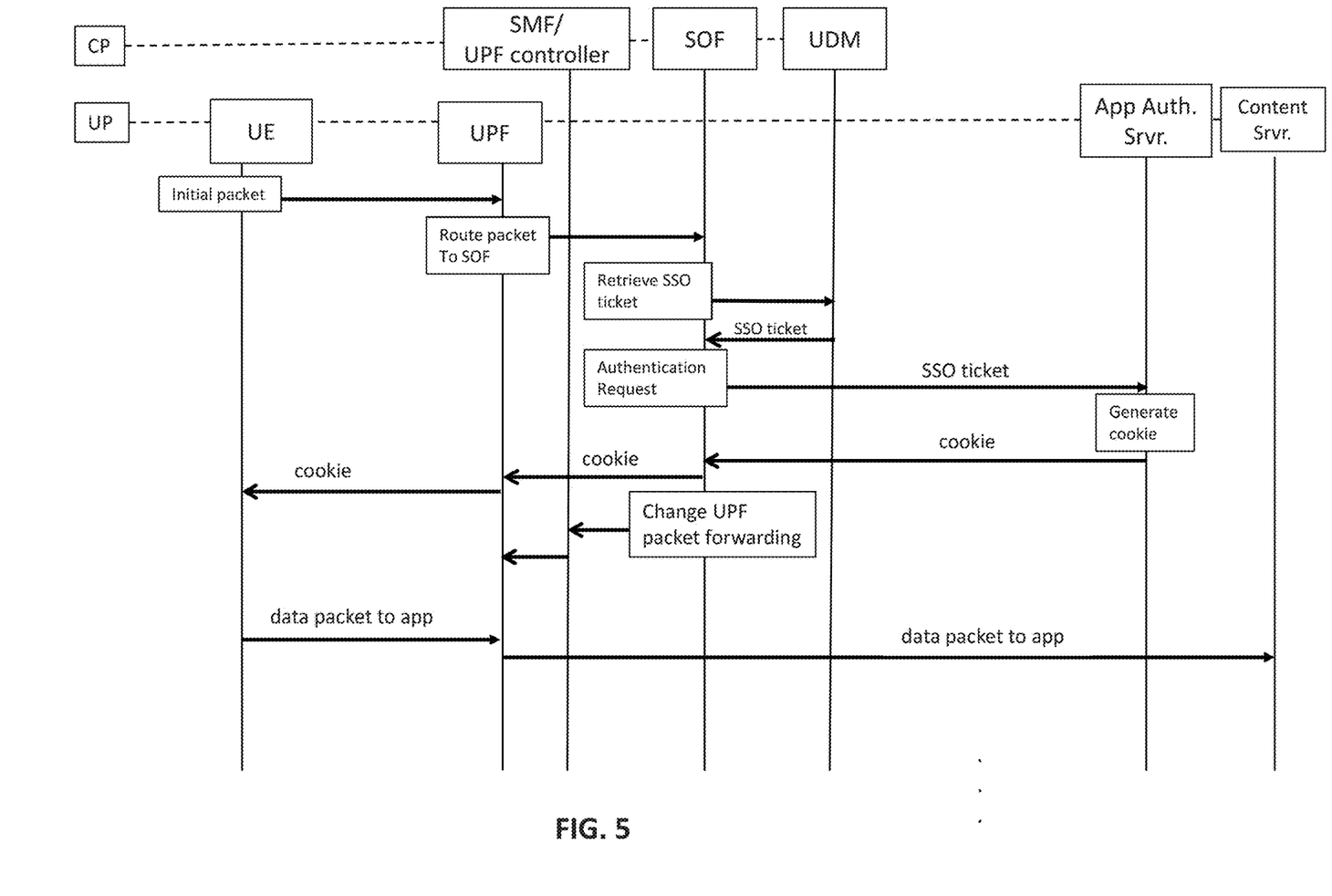
FIG. 5 illustrates an exemplary user plane (UP) message sequence according to invention.

FIGS. 4 and 5 illustrate the simple steps of the authentication process when UE 110 tries to reach service application that registered with SOF.

Step-1—UE 110 first sends the authentication packet to UPF 107 that is serving the data plane of the slice. This step is by default how all data packets originating from the UE are routed.

Step-2—SOF 129, receiving the authentication IP packet of UE 110 from UPF 107, it retrieves the user's SSO ticket from the UDM. Note that the ticket is associated with the user's assigned IP address.

Step-3—SOF 129 sends the digitally signed SSO ticket to service application's authentication server 142.

Step-4—In response, service application 142 directly returns a digitally signed access-pass (or cookie) towards UE 110's IP's address, and an OK message towards SOF 129. Along with the access-pass, the authentication server sends the link(s) of the content server 143.

Step-5—UE 110 reaches content server 143.

After receiving the OK message from the service application 142, SOF 129 instructs UPF controller 108 to send all packets of UE 110 using normal packet route of the slice.

Figure 6:
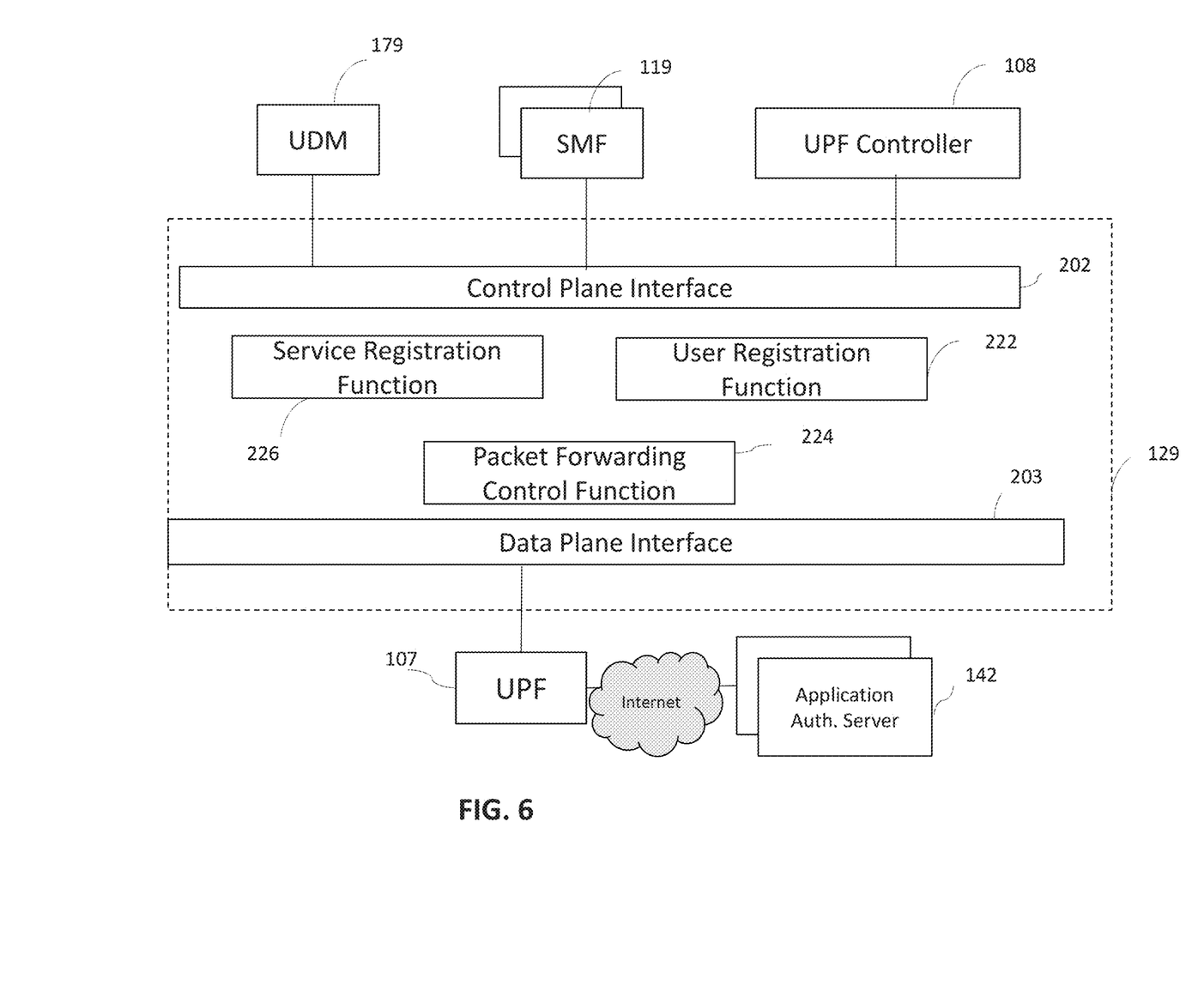
FIG. 6 depicts a simple block diagram showing components of Single Sign-On Function (SOF).

A simple block diagram of SOF's shown in FIG. 6. There are mainly two interfaces of SOF: Control plane interface 202 towards other control functions such as SMF 119, UDM 179 and UPF Controller 108 (if it is a separate function from the SMF), and Data Plane 203 interface towards UPF 107. Control plane interfaces support simple protocols such as REST API or HTTP to send and receive data. Via UPF 107, SOF establishes secure connections towards each service authentication server 142 as illustrated in the figure. This can be an encrypted connection. SOF has three key functions: Service application registration function 226, User registration function 222 and packet forwarding control function 224. This embodiment assumes that no data is stored within SOF. If the UE's IP address(es) change, SMF informs SOF, in which case SOF makes appropriate changes in the packet forwarding rules as well as in the UDM database.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method have been shown in the above embodiments for the effective implementation of a single sign-on control function (SOF) for mobile networks. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific hardware.

The invention claimed is:

1. An article of manufacture comprising non-transitory computer storage medium storing computer readable program code which, when executed by a computer, implements a method as implemented in a Single Sign-On Function (SOF), the article of manufacture comprising:
  (a) computer readable program code implementing a first communication interface to communicate with a session management function (SMF) component, the first communication interface communicating user's mobile network-specific authentication information;
  (b) computer readable program code implementing a second communication interface to communicate with a Unified Data Management (UDM) component, the second communication interface communicating registry information and service application-specific user authentication information to the UDM;
  (c) computer readable program code implementing a third communication interface to communicate with a User Plane Function (UPF) controller, the third communication interface communicating specific routing policies based on an IP address of one or more data packets originating from a User Equipment (UE) to enable a single sign on (SSO) service with the UPF controller;
  (d) computer readable program code implementing a fourth communication interface to communicate with at least one application authentication server, the fourth communication interface: (1) communicating with the at least one application authentication server to register at least one application service and, after registering, (2) communicating with the at least one application authentication server to receive a digitally signed SSO ticket assigned to the UE that is connected to a mobile network,
  wherein the SOF is implemented in a control plane and the UE is associated with at least one premium network slice, and a unique private IP address (user_IP_address) is assigned to the UE; and
  wherein the SOF sends a special packet forwarding instruction to the UPF Controller to route the one or more packets received by UPF that is sourced by the user_IP_address of the UE to a service_IP_address of the at least one application authentication server.

2. The article of manufacture of claim 1, wherein when the UE connects to the mobile network and attempts to access the at least one application authentication server, the SOF intercepts such an access request and presents the digitally signed SSO ticket on behalf of the UE, and enables the at least one application authentication server to immediately create and send a digitally signed cookie or an application pass to a client associated with the UE, after which, the UE does not need subsequent authentication until the cookie or the application pass has expired.

3. The article of manufacture of claim 1, wherein the SOF allows bypassing of sign-in procedures of at least one service application once an operator authenticates the UE by providing a secure mapping of user credentials from a domain associated with the mobile network to another domain associated with the at least one service application.

4. The article of manufacture of claim 3, where the at least one service application comprises a mobile web application.

5. The article of manufacture of claim 1, wherein the digitally signed SSO ticket comprises any of, or a combination of, the following: a telephone number associated with the UE, a social security number associated with the UE, and a pre-defined length of time applicable to SSO.

6. The article of manufacture of claim 1, wherein the fourth communication interface comprises a plurality of additional interfaces and the at least one application authentication server comprises a plurality of application authentication servers, wherein each interface within the plurality of additional interfaces associated individual application authentication servers in the plurality of application authentication servers.

7. The article of manufacture of claim 1, wherein the fourth communication traverses the public Internet as well as a user plane (UP) of a mobile core network between the at least one application authentication server and the SOF through a secure, encrypted, connection.

8. The article of manufacture of claim 7, wherein secure, encrypted, connection is any of, or a combination of, the following: a VPN or an IPSec tunnel.

9. The article of manufacture of claim 1, wherein the SOF is implemented as any of the following: a Virtual Network Function (VNF) or Physical Network Function (PNF).

10. The article of manufacture of claim 1, wherein the SOF is co-resident with the SMF.

11. The article of manufacture of claim 1, wherein the SOF comprises a resident database storing registration information.

12. The article of manufacture of claim 1, wherein the UDM component stores registration information.

13. A method as implemented in a Single Sign-On Function (SOF), the SOF comprising (i) a first communication interface to communicate with a session management function (SMF) component, the first communication interface communicating user's mobile network-specific authentication information; (ii) a second communication interface to communicate with a Unified Data Management (UDM) component, the second communication interface communicating registry information and service application-specific user authentication information to the UDM; (iii) a third communication interface to communicate with a User Plane Function (UPF) controller, the third communication interface communicating specific routing policies based on an IP address of one or more data packets originating from a User Equipment (UE) to enable a single sign on (SSO) service with the UPF controller; (iv) a fourth communication interface to communicate with at least one application authentication server, the fourth communication interface: communicating with the at least one application authentication server to register at least one application service and, after registering, communicating with the at least one application authentication server to receive a digitally signed SSO ticket assigned to the UE that is connected to a mobile network, the SOF is implemented in a control plane and the UE is associated with at least one premium network slice, the method comprising:

(a) securely registering the at least one application authentication server, wherein the registering comprises receiving the following information from the at least one application authentication server: (1) a unique service-ID or name, and (2) an IP address(es) or hostname;

(b) sending received information in (a) to the UDM;

(c) receiving the digitally signed SSO ticket and a telephone number of the UE;

(d) sending the digitally signed SSO ticket and a telephone number of the UE to the UDM for storage;

(e) assigning a unique private IP address (user_IP_address) to the UE when the UE connects to the mobile network; and (f) sending a special packet forwarding instruction to the UPF Controller to route the one or more packets received by UPF that is sourced by the user_IP_address of the UE to a service_IP_address of the at least one application authentication server.

14. The method of claim 13, wherein when the UE connects to the mobile network and attempts to access the at least one application authentication server, the SOF intercepts such an access request and presents the digitally signed SSO ticket on behalf of the UE, and enables the at least one application authentication server to immediately create and send a digitally signed cookie or an application pass to a client associated with the UE, after which, the UE does not need subsequent authentication until the cookie or the application pass has expired.

15. The method of claim 13, wherein the SOF allows bypassing of sign-in procedures of at least one service application once an operator authenticates the UE by providing a secure mapping of user credentials from a domain associated with the mobile network to another domain associated with the at least one service application, where the at least one service application comprises a mobile web application.

16. The method of claim 13, wherein the digitally signed SSO ticket comprises any of, or a combination of, the following: a telephone number associated with the UE, a social security number associated with the UE, and a pre-defined length of time applicable to SSO.

17. The method of claim 13, wherein the fourth communication interface comprises a plurality of additional interfaces and the at least one application authentication server comprises a plurality of application authentication servers, wherein each interface within the plurality of additional interfaces associated individual application authentication servers in the plurality of application authentication servers.

18. The method of claim 13, wherein the fourth communication traverses the public Internet as well as a user plane (UP) of a mobile core network between the at least one application authentication server and the SOF through a secure, encrypted, connection, wherein secure, encrypted, connection is any of, or a combination of, the following: a VPN or an IPSec tunnel.

19. The method of claim 13, wherein the SOF is implemented as any of the following:

a Virtual Network Function (VNF) or Physical Network Function (PNF).

20. An article of manufacture comprising non-transitory computer storage medium storing computer readable program code which, when executed by a computer, implements a method as implemented in a Single Sign-On Function (SOF), the SOF comprising (i) a first communication interface to communicate with a session management function (SMF) component, the first communication interface communicating user's mobile network-specific authentication information; (ii) a second communication interface to communicate with a Unified Data Management (UDM) component, the second communication interface communicating registry information and service application-specific user authentication information to the UDM; (iii) a third communication interface to communicate with a User Plane Function (UPF) controller, the third communication interface communicating specific routing policies based on an IP address of one or more data packets originating from a User Equipment (UE) to enable a single sign on (SSO) service with the UPF controller; (iv) a fourth communication interface to communicate with at least one application authentication server, the fourth communication interface: communicating with the at least one application authentication server to register at least one application service and, after registering, communicating with the at least one application authentication server to receive a digitally signed SSO ticket assigned to the UE that is connected to a mobile network, the SOF is implemented in a control plane and the UE is associated with at least one premium network slice, the article of manufacture comprising:

(a) computer readable program code securely registering the at least one application authentication server, wherein the registering comprises receiving the following information from the at least one application authentication server: (1) a unique service-ID or name, and (2) an IP address(es) or hostname;

(b) computer readable program code sending received information in (a) to the UDM;

(c) computer readable program code receiving the digitally signed SSO ticket and a telephone number of the UE;

(d) computer readable program code sending the digitally signed SSO ticket and a telephone number of the UE to the UDM for storage;

(e) computer readable program code assigning a unique private IP address (user_IP_address) to the UE when the UE connects to the mobile network; and (f) computer readable program code sending a special packet forwarding instruction to the UPF Controller to route the one or more packets received by UPF that is sourced by the user_IP_address of the UE to a service_IP_address of the at least one application authentication server.

* * * * *